Nov. 9, 1926.

T. OLINGER

PULLEY SHEAVE

Original Filed Nov. 21, 1921

1,606,175

Inventor
Thomas Olinger
By Frank E. Liverance, Jr.
Attorney

Patented Nov. 9, 1926.

1,606,175

UNITED STATES PATENT OFFICE.

THOMAS OLINGER, OF HOLLAND, MICHIGAN, ASSIGNOR TO FEDERAL MANUFACTURING COMPANY, OF HOLLAND, MICHIGAN, A CORPORATION OF MICHIGAN.

PULLEY SHEAVE.

Original application filed November 21, 1921, Serial No. 516,541. Divided and this application filed July 11, 1923. Serial No. 650,800.

This invention relates to a pulley or sheave adapted to be used in pulleys, being a division of my pending application Ser. No. 516,541, filed Nov. 21, 1921, which has become Patent No. 1,501,290, patented July 15, 1924. The sheave forming the subject matter of the present invention is particularly adapted for use in the manufacture of sheet metal pulleys such as are used in installing the draft chains of furnaces, though not in any sense limited in use to the one type of pulley named, and the construction shown and described hereafter is one in which large quantity manufacture at low cost coupled with a durable construction is readily attained. Essentially the sheave consists of two parts of identical construction, each forming one half of the sheave, two of the parts being placed back to back and permanently secured together in a novel manner for the completion of the sheave. And this attachment is one very simple to make, interengaging tongues being struck from the contacting backs of the two parts in the same direction which preclude the separation of the parts. My invention has for its object and purpose, the provision of a sheave having the above described ends in view, all of which will appear fully and in detail as understanding of the invention is had from the following description, taken in connection with the accompanying drawing, in which, Fig. 1 is a side elevation of the pulley sheave made in accordance with my invention.

Like reference characters refer to like parts in the different figures of the drawing.

Figure 1:
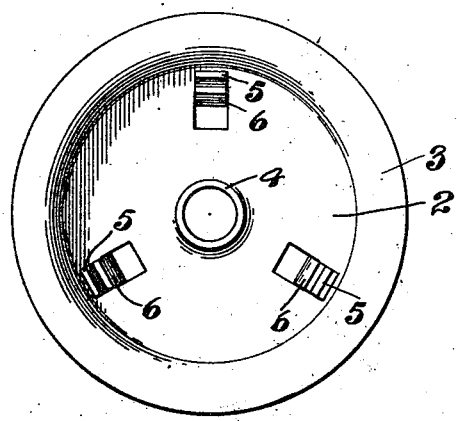
Figure 2:
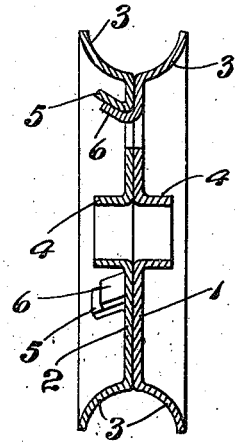
Fig. 2 is a central vertical section therethrough.
Figure 3:
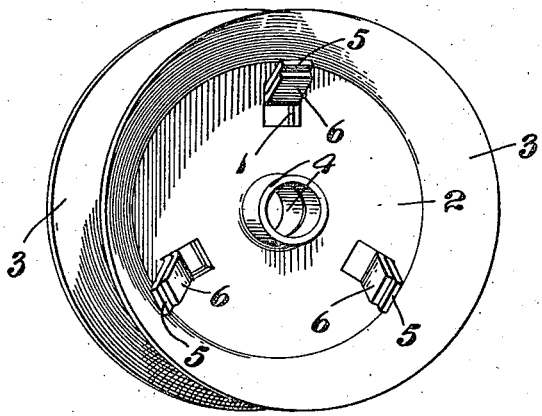
Fig. 3 is a perspective view of the sheave looking toward one side and at one edge of the same.

In the construction of the sheave, two halves or parts of identical form are made from sheet metal, said parts having flat backs 1 and 2 of circular outline, from each of which at the edges, outwardly curved flanges 3 project in opposite directions when the backs 1 and 2 are placed in contact with each other so that when the backs are secured together, the said flanges 3 provide a continuous groove entirely around the sheave for the reception of a cable, chain or other flexible member such as is commonly used with pulleys. Each of the halves or parts of the sheave has a centrally located hub 4 pressed therefrom, the two hubs extending in opposite directions and in alinement with each other in the completed sheave.

It will be noted that so far as described, the two halves of the sheaves are absolutely identical in every respect and can be made with the same dies. The two halves are placed with their backs 1 and 2 in contact and tongues 5 and 6 struck from the backs 2 and 1 respectively, in the same direction, said tongues 5 from the back 2 being bent outwardly nearly in parallelism with the flange 3 and the tongues 6 from the back 1 passing through the openings in the back 2 left by striking the tongues 5 therefrom and then being bent so as to lie in close contact with and interlock with the said tongues 5. This makes a secure and permanent connection of the two halves of the sheave and the completed sheave has the said tongues 5 and 6 lying within the plane of the outer edges of the flange 3 so as not to project to interfere with the hanger in which the sheave may be mounted, thus allowing free rotation of the sheave at all times.

The construction is very simple yet durable and practical. But one set of dies is required and the connection of two parts is a practically instantaneous operation, all of the tongues of both parts being punched at the same time and bent so as to interlock with each other by a simple punch press operation. A large quantity production at very low cost is possible and the invention is very valuable in this respect and has so proved in the construction of hundreds of thousands of the sheaves since the invention was made.

I claim:

1. A sheave comprising two halves placed together back to back, and tangs struck from both the contacting backs of the halves of the sheave in the same direction and interengaged to permanently connect said halves of the sheave together.

2. A sheave comprising two identical halves, each formed from a single piece of sheet metal and each having a back and an outwardly extending flange, said backs of the two halves of the sheave being placed in contact relation, and tongues struck from both backs in the same direction and interlocked to permanently connect said halves of the sheave together.

3. A sheave comprising two identically formed halves each made from a single piece of sheet metal, tongues struck from one of said halves outwardly, and other tongues struck from the other half of the sheave and passing through the openings in the first half made by striking its tongues therefrom, all of the tongues being bent to make an interlocking engagement whereby the said halves of the sheave are permanently secured together.

In testimony whereof I affix my signature.

THOMAS OLINGER.